US012752241B2

(12) United States Patent
Hasan et al.

(10) Patent No.: US 12,752,241 B2
(45) Date of Patent: Oct. 6, 2026

(54) ECO-FRIENDLY MEMBRANES FOR SEPARATIONS

(71) Applicant: Khalifa University of Science and Technology, Abu Dhabi (AE)

(72) Inventors: Shadi Wajih Hasan, Abu Dhabi (AE); Farah Abuhatab, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 132 days.

(21) Appl. No.: 18/883,632

(22) Filed: Sep. 12, 2024

(65) Prior Publication Data

US 2026/0070021 A1 Mar. 12, 2026

(51) Int. Cl.
*B01D 67/00* (2006.01)
*B01D 61/14* (2006.01)
*B01D 71/48* (2006.01)

(52) U.S. Cl.
CPC ........ *B01D 67/0011* (2013.01); *B01D 61/145* (2013.01); *B01D 67/0016* (2013.01); *B01D 71/48* (2013.01); *B01D 2323/219* (2022.08); *B01D 2325/02833* (2022.08)

(58) Field of Classification Search
CPC ... B29C 65/4895; B29C 70/547; B29C 67/20; B29C 45/1736; B29C 45/14795; B29C 45/14778; B29C 44/356; B29C 44/005; B29C 41/16; B29C 66/5412; B29C 2043/3647
See application file for complete search history.

(56) References Cited

FOREIGN PATENT DOCUMENTS

EP 4438163 * 3/2023

OTHER PUBLICATIONS

Kahrs, et al., "Membrane formation via non-solvent induced phase separation using sustainable solvents: A comparative study", Polymer 186 (2020) 122071.

* cited by examiner

*Primary Examiner* — Stella K Yi
(74) *Attorney, Agent, or Firm* — Billion & Armitage

(57) ABSTRACT

A method of fabricating an eco-friendly, porous membrane includes preparing a porous membrane using a dope solution of polymer, dimethyl sulfoxide (DMSO), and one or more deep eutectic solvents (DES). The porous PLA membrane can be formed from the dope solution through non-solvent induced phase separation (NIPS). A concentration of the one or more deep eutectic solvents in the dope solution can be between about 0.5 and 3.0 weight percent. The one or more deep eutectic solvents results in the membrane having increased porosity and a larger average pore size diameter. In an example, the one or more deep eutectic solvents includes choline chloride (ChCl) and ethylene glycol (EG). In an example, the membrane can be used for oil-water separation and the oil rejection of the membrane is at least 80 percent.

17 Claims, 12 Drawing Sheets

Surface Cross-Section Bottom

PLA:G:DES 1 (0.5%)

Surface Cross-Section Bottom

PLA:G:DES 1 (1%)

Surface Cross-Section Bottom

PLA:G:DES 1 (2%)

Surface Cross-Section Bottom

PLA:G:DES 1 (3%)

ECO-FRIENDLY MEMBRANES FOR SEPARATIONS

TECHNICAL FIELD

The subject matter disclosed herein relates to membrane filtration and methods of preparing membranes and, in particular, to eco-friendly membranes for separations.

BACKGROUND

The continuous need for water and its increasing scarcity are major forces behind the increased development of various water treatment technologies. Membrane technologies like reverse osmosis (RO), ultrafiltration (UF), and nanofiltration (NF) are among some of the most widely adopted techniques for water treatment, including oil and water separation. The non-solvent induced phase inversion technique is one of the most suitable processes for membrane fabrication. The likelihood of secondary contamination, however, is a continual drawback for this method since the majority of polymers commonly used are derived from petroleum and are typically not biodegradable.

The dissolving solvent used in membrane formation can be central to determining the characteristics of the membrane. The solvent is also commonly the main source of concern regarding the environment, human health, and safety. Common dissolving solutions, such as N-methyl-2-pyrrolidone (NMP) or Dimethylacetamide (DMAc) are toxic and hazardous. Thus, these solvents directly contradict the standards established by green solvents and the concepts of green chemistry.

The potential of green membrane fabrication methods lies in their ability to produce environmentally friendly membranes with reduced environmental impact. By minimizing the use of harmful chemicals and reducing energy consumption, green membrane fabrication methods can contribute to mitigating pollution and conserving resources. It would be beneficial to develop an environmentally friendly fabrication technique that uses green materials to form ultrafiltration membranes that effectively separate substances, such as oil and water.

SUMMARY

According to one aspect, a method of forming a porous membrane includes preparing a porous membrane using a dope solution of polymer, dimethyl sulfoxide (DMSO), and one or more deep eutectic solvents (DES).

According to another aspect, a method of fabricating an ultrafiltration membrane includes forming a deep eutectic solvent (DES) solution of a hydrogen bond acceptor (HBA) and a hydrogen bond donor (HBD); forming a polymer solution by dissolving a PLA polymer in dimethyl sulfoxide (DMSO); mixing the DES solution and the polymer solution to form a dope solution; casting the dope solution onto a plate; and immersing the plate in a coagulation bath to form a porous PLA membrane; and optionally rinsing the porous PLA membrane to remove residual solvents and impurities.

According to another aspect, a method of separating oil and water using an ultrafiltration membrane includes fabricating an ultrafiltration membrane from PLA, dimethyl sulfoxide (DMSO) and one or more deep eutectic solvents (DES) using non-solvent induced phase separation; and filtering an oil-water emulsion through the ultrafiltration membrane to remove oil from water.

BRIEF DESCRIPTION OF THE DRAWINGS

In the drawings, which are not necessarily drawn to scale, like numerals may, in some instances, describe similar components in different views. The drawings illustrate generally, by way of example, but not by way of limitation, various embodiments discussed herein.

DETAILED DESCRIPTION

Figure 1:
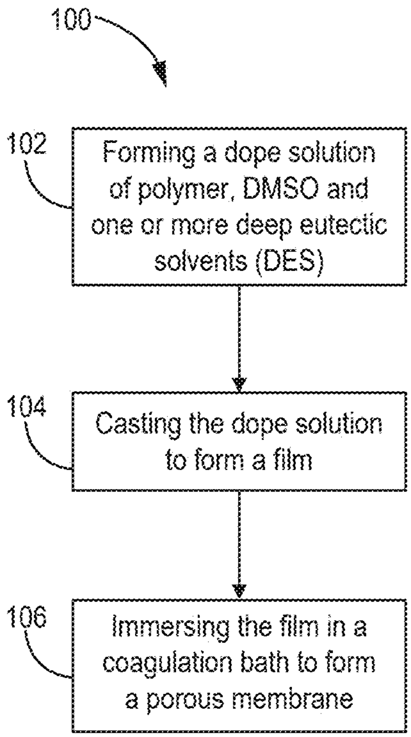
FIG. 1 is a flowchart illustrating a method of forming a porous membrane, according to some embodiments.

The present disclosure is directed to eco-friendly membranes and fabrication methods for producing such membranes. The membranes can be used to filter various contaminants found in water, such as oil. This membrane can be formed by a polymer such as polylactic acid (PLA); dissolving solvent (e.g., dimethylesulfoxide (DMSO)), and a selected deep eutecic solvent (DES), (e.g., choline chloride and ethylene glycol at molar ratio of 1:2 (ChCl:EG 1:2)). The polymer, acting as the building block of the membrane, undergoes dissolution in a compatible solvent. Here, PLA is a bio-based material that can be synthesized from non-toxic renewable resources was selected. The present disclosure is directed to replacement of a conventional solvent used in membrane fabrication with an eco-friendly solvent, as well as incorporation of a pore forming agent, resulting in a ultrafiltration membrane with high porosity and oil rejection.

In one example, PLA was dissolved in DMSO solvent. Further enhancement in the membrane fabrication can involve the incorporation of a pore-forming agent into the polymer/solvent solution, which results in the formation of a dope solution. Deep eutectic solvents (DES) can be used here as efficient pore-forming agents for high-performance membrane fabrication. In one non-limiting example, these DES can be used in place of Polyvinylpyrrolidone (PVP) 10K, Polyvinylpyrrolidone (PVP) 40K, and polyethylene glycol (PEG). Subsequently, the dope solution can be casted to generate flat sheet membranes with specific structures and properties.

The inventors of the present application did extensive studies that resulted in the improved fabrication method and resulting UF membranes disclosed herein. First, two PLA membranes were fabricated to investigate the influence of substituting a conventional toxic solvent, such as DMAc, with an environmentally friendly solvent like dimethyl sulfoxide (DMSO). DMSO has low volatility, low toxicity, biodegradability, and compatibility with a variety of polymers, making it a promising "green" solvent for polymer dissolution. Second, the influence of incorporating DES as an additive was assessed by fabricating membranes composed of a mixture of PLA, DMSO and various DESs with a concentration of 1 wt. %. The DESs included two hydrophilic ones, specifically betaine:levulinic acid (Bet:LevA, e.g., molar ratio of 1:7) and choline chloride/ethylene glycol (ChCl:EG, e.g., molar ratio of 1:2), along with a hydrophobic DES, specifically menthol:thymol (Men:Thy, e.g., molar ratio of 1:1). The results of these assessments, which are included in the Examples below, showed favorable properties and performance for UF membranes formed from PLA with DMSO as a solvent and ChCl:EG (e.g., 1:2) DES as an additive. Third, various amounts or concentrations of ChCl:EG were used to determine an appropriate amount or range of DES for use in membrane fabrication based on membrane physiochemical properties and performance.

While the switch to eco-friendly materials caused physical changes in the fabricated membranes and thus altered their structures, the chemical composition of the membranes remained intact, as compared to membranes formed with PLA and a conventional solvent such as DMAc. Moreover, the combination of eco-friendly solvents and additives provided herein resulted in membranes with increased water permeability (or water flux) and higher oil rejection during ultrafiltration tests. Thus, the fabrication methods herein provide a green or eco-friendly process for producing a green ultrafiltration membrane.

A method of forming a porous membrane can include: preparing a porous membrane using a dope solution of polymer, dimethyl sulfoxide (DMSO), and one or more deep eutectic solvents (DES). The dope solution can include various components of the present disclosure. FIG. 1 illustrates an example of a method 100 of forming a porous membrane. The resulting membrane can be used for ultrafiltration and specifically can be used, in one example, to separate oil and water. The membrane can be used for rejection of various contaminants including the rejection of oil in water.

In step 102, a dope solution is formed of polymer (e.g., 20 wt. %), solvent (e.g., 80 wt. %) and one or more deep eutectic solvents (DES) of various concentrations. In one example, the weight percentage of polymer in the dope solution can range from about 10 wt. % to about 40 wt. %, and the weight percentage of solvent in the dope solution can range from about 60 wt. % to about 90 wt. %.

The weight percentage of polymer in the dope solution can be greater than 10 wt. %. In one example, the weight percentage of polymer in the dope solution can be about 20 wt. %. The weight percentage of solvent in the dope solution can be greater than 70 wt. %. In one example, the weight percentage of solvent in the dope solution ranges from about 77 wt. % to about 80 wt. %. The polymer can include PLA and the solvent can include DMSO. In one example, the weight percentage of DES in the dope solution can range from about 0.5 wt. % to about 3 wt. %. In another example, the weight percentage of DES in the dope solution can be greater than about 0.5 wt. %.

The one or more deep eutectic solvents can include a hydrogen bond acceptor (HBA) and a hydrogen bond donor (HBD). In an example, the HBA is choline chloride (ChCl) and the HBD is ethylene glycol (EG). In an example, a molar ratio of ChCl to EG in the dope solution is about 1:2. The molar ratio can be varied such that the ratio of HBA:HBD is greater than 1. The molar ratio can be varied such that the ratio of HBA:HBD is less than or equal to 1. A concentration of DES in the dope solution can be greater than 0.1 weight percent (wt. %). A concentration of DES in the dope solution can range between about 0.5 and about 3.0 weight percent. In an example, the DES concentration is between about 1 and about 2 weight percent.

In step 104, the dope solution is cast to form a film. The dope solution can be cast onto a plate. In step 106, the formed film is immersed in a coagulation bath. Non-solvent induced phase separation (NIPS) is used to form the porous membrane. Properties of the porous membrane are described below.

Figure 2:
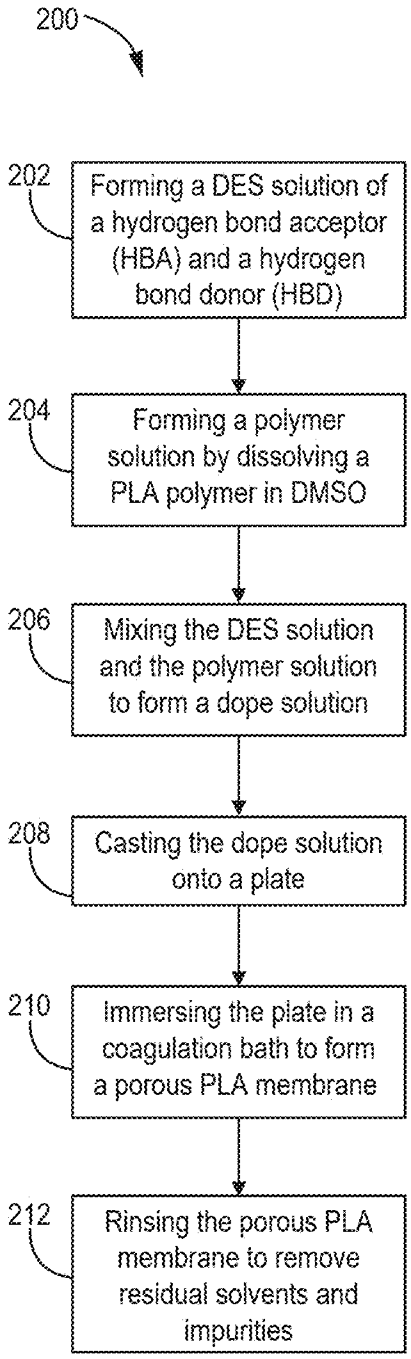
FIG. 2 is a flowchart illustrating a method of forming an ultrafiltration membrane, according to some embodiments.

FIG. 2 illustrates an example of a method 200 of fabricating a porous ultrafiltration membrane for separations, such as for oil-water separation. In step 202, a DES solution is formed of a hydrogen bond acceptor (HBA) and a hydrogen bond donor (HBD). In an example, the HBA can include choline chloride (ChCl), betaine (Bet) or menthol (Men). In an example, the HBD can include ethylene glycol (EG), levulinic acid (LevA) or thymol (Thy). In an example, the HBA is ChCl and the molar ratio of ChCl to EG is about 1:2. The DES solution can be hydrophilic or hydrophobic.

In step 204, a polymer solution is formed by dissolving a PLA polymer (e.g., 20 wt. %) in DMSO (e.g., 80 wt. %). The PLA polymer can be in the form of polymer beads. In one example, the weight percentage of polymer in the dope solution can range from about 10 wt. % to about 40 wt. %, and the weight percentage of solvent in the dope solution can range from about 60 wt. % to about 90 wt. %. Note that steps 202 and 204 do not need to be performed in a particular order.

In step 206, a dope solution is formed by mixing the DES solution from step 202 and the polymer solution from step 204. In an example, a sum of HBA and HBD in the dope solution is between about 0.5 and about 3.0 percent by weight. In another example, the sum (also referred to as the DES concentration) is between about 1 and about 2 wt. %. In yet another example, the sum is about 2 wt. %. The weight percentage of polymer in the dope solution can be greater than 10 wt. %. In one example, the weight percentage of polymer in the dope solution can be about 20 wt. %. The weight percentage of solvent in the dope solution can be greater than 70 wt. %. In one example, the weight percentage of solvent in the dope solution ranges from about 77 wt. % to about 80 wt. %. The polymer can include PLA and the solvent can include DMSO.

The dope solution is then cast onto a plate in step 208. Next, the plate is immersed in a coagulation bath under step 210 thereby forming a porous PLA membrane via NIPS. The coagulation bath can include deionized water at room temperature (e.g., about 20° C.). In some embodiments, the plate is left in the coagulation bath for about 24 hours in forming the membrane. For example, various times can be used to promote reaching a substantially maximum rate of exchange between solvent and non-solvent and to promote solidification. In step 212, the porous PLA membrane is rinsed to remove residual solvents and impurities. In one example, step 212 is optional. Properties of the porous PLA membrane are included below. Steps in method 200 can be performed in various orders, and one or more steps can optionally be repeated.

A porous membrane formed from PLA, DMSO and one or more deep eutectic solvents, using the fabrication methods described herein, is effective for separating oil from an oil-water emulsion. The porous membrane can also be referred to as an ultrafiltration membrane. The porous membrane can have an average pore size diameter of between about 50 nm and about 150 nm. In some embodiments, the porous membrane can have an average pore size diameter of between about 70 nm and about 100 nm. The porous membrane can have an average pore size diameter of between about 80 nm and about 90 nm. The porous membrane can have an average pore size diameter of between about 70 nm and about 80 nm. The porous membrane can have an average pore size diameter between about 70 and about 100 nm and a porosity between about 70 and about 90 percent.

The oil rejection capability of the porous membrane can be at least 80%, at least 90%, or at least 96% when an oil-water emulsion is filtered through the ultrafiltration membrane (e.g., at a flow rate of about 0.1 m/s) and an amount of oil in the oil-water emulsion is about 100 to 1000 ppm. A permeate flux of the ultrafiltration membrane is at least 800 LMH. The permeate flux can be between about 700 and about 1150 LMH.

A method for separating oil and water using an ultrafiltration membrane includes fabricating an ultrafiltration membrane from PLA. DMSO and one or more DESs using non-solvent induced phase separation and filtering an oil-water emulsion through the ultrafiltration membrane to remove oil from water. The flow rate of the emulsion through the membrane can be about 0.1 m/s. The method can include subsequent cycles of filtering an oil-water emulsion through the ultrafiltration membrane and the ultrafiltration membrane can be rinsed after each cycle to remove oil from the surface of the membrane.

An exemplary amount of oil in an oil-water emulsion suitable for filtration through the membranes described herein can be about 100 ppm to about 1000 ppm. An exemplary amount of oil in an oil-water emulsion suitable for filtration through the membranes described herein can be about 1000 ppm. The oil rejection of the membranes is at least 80%, and in some embodiments, the oil rejection is at least 90%. The oil rejection of the membrane can be at least 96%. A permeate flux of the membranes is at least about 800 LMH, and in some embodiments, the permeate flux is between about 800 and about 1150 LMH.

The green fabrication methods disclosed herein offer the potential for scalability and cost-effectiveness for porous membranes, making them attractive for large-scale membrane production. By utilizing renewable resources and optimizing manufacturing processes, these methods can enhance the sustainability of membrane technology while maintaining or even improving membrane performance. Furthermore, these green fabrication methods foster innovation and encourage the development of novel materials and techniques to address global challenges, while promoting environmental stewardship and resource conservation. By exploring bio-based polymers, green solvents, and biodegradable additives, the inventors have fabricated ultrafiltration membranes with unique properties and functionalities for various applications, including water treatment, healthcare, and energy production. In particular, the use of these membranes for water treatment addresses ongoing global water challenges.

The following Examples are intended to illustrate the above invention and should not be construed as to narrow its scope. One skilled in the art will readily recognize that the inventors suggest many other ways in which the invention could be practiced. It should be understood that numerous variations and modifications may be made while remaining within the scope of the invention.

EXAMPLES

Materials

Menthol (Men, >98.0%), thymol (Thy, >98.5%), betaine (Bet, ≥98.0%), choline chloride (ChCl, >99.0%), and ethylene glycol (EG, ACS Reagent) were purchased from Sigma Aldrich, while levulinic acid (LevA, ≥98.0%) was purchased from Across. PLA was obtained from Nature Works LLC, denoted by Ingeo™ Biopolymer 4060D. DMAc and DMSO were obtained from Sigma-Aldrich. Deionized water (DI) was obtained from a Millipore Milli-Q Plus 185 filtration unit (Millipore Corp., USA).

Example 1—Membrane Fabrication

Various PLA membranes were synthesized using non-solvent induced phase separation (NIPS). The components used in forming the various PLA membranes are shown in Table 1 below. A first batch (Samples 1 and 2) did not contain any DES. A second batch (Samples 3-6) contained different types of DES. A third batch (Samples 7-10) contained a specific DES (ChCl:EG) at varying amounts.

TABLE 1

Composition of dope solutions for membrane fabrication

| Batch | Sample | Components | Abbreviation | Polymer (wt %) | Solvent (wt %) | Additive/ DES (wt %) |
|---|---|---|---|---|---|---|
| 1 | 1 | PLA:DMAc | PLA:C | 20 | 80 | 0 |
| | 2 | PLA:DMSO | PLA:G | 20 | 80 | 0 |
| 2 | 3 | PLA:DMSO:ChCl:EG (1:2) 1% | PLA:G:DES 1 (1%) | 20 | 79 | 1 |
| | 4 | PLA:DMSO:Bet:LevA (1:7) 1% | PLA:G:DES 2 (1%) | 20 | 79 | 1 |
| | 5 | PLA:DMSO:Men:Thy (1:1) 1% | PLA:G:DES 3 (1%) | 20 | 79 | 1 |
| | 6 | PLA:DMAc:ChCl:EG (1:2) 1% | PLA:G:DES 4 (1%) | 20 | 79 | 1 |
| 3 | 7 | PLA:DMSO:ChCl:EG (1:2) 0.5% | PLA:G:DES 1 (0.5%) | 20 | 79.5 | 0.5 |
| | 8 | PLA:DMSO:ChCl:EG (1:2) 1% | PLA:G:DES 1 (1%) | 20 | 79 | 1 |
| | 9 | PLA:DMSO:ChCl:EG (1:2) 2% | PLA:G:DES 1 (2%) | 20 | 78 | 2 |
| | 10 | PLA:DMSO:ChCl:EG (1:2) 3% | PLA:G:DES 1 (3%) | 20 | 77 | 3 |

Samples 1 and 2 were fabricated using PLA and a solvent (DMAc or DMSO). Initially, PLA polymer beads were dried overnight at 70° C. The casting solutions were prepared by mixing 80 wt % of solvent (DMAc or DMSO) with the 20 wt % dry PLA beads at 70° C. This was followed by sonication for 20 minutes to obtain homogeneous dispersions. Next, the mixtures were magnetically stirred for 24 hours at 70° C. and 300 rpm to ensure polymer dissolution. The dope solutions were then degassed and aerated using a sonicator and vacuum oven for 4 hours at 30° C. Subsequently, the dope solutions were casted onto a dry glass plate using a casting knife with a 200 μm gap. The casted membranes were immediately immersed in a coagulation bath of DI water at room temperature and were left in the coagulation bath for 24 hours. Finally, the fabricated membranes were washed and soaked with water to remove the residual solvents and impurities.

Under the same conditions, a second batch of samples (Samples 3-6) were prepared with DES used in combination with the solvent and PLA. In Batch 2, different types of HBA and HBD forming a DES were tested. Samples 3-5 were formed using DMSO. Sample 6 was formed using DMAc.

The DES was prepared by measured amounts of HBA (ChCl, for example) and HBD (EG, for example) at a specific molar ratio (HBA:HBD), specified in Table 1, and placed in a vial. The suspension was mixed using a temperature-controlled incubator shaker (IKA KS 4000) i-control at 60° C. until a homogeneous colorless liquid was formed.

Then the same steps described above for Samples 1 and 2 were performed. The DES solution was added with the solvent and PLA beads to form the casting solution. The amount of DES for each sample in Batch 2 was 1 wt. %.

Under the same conditions, a third batch of samples (Samples 7-10) were prepared with a specific DES (ChCl:EG) at varying weight percents in the casting solution. In Samples 7-10 the molar ratio of ChCl:EG was 1:2.

Example 2—Results of Batch 1

Figure 3A:
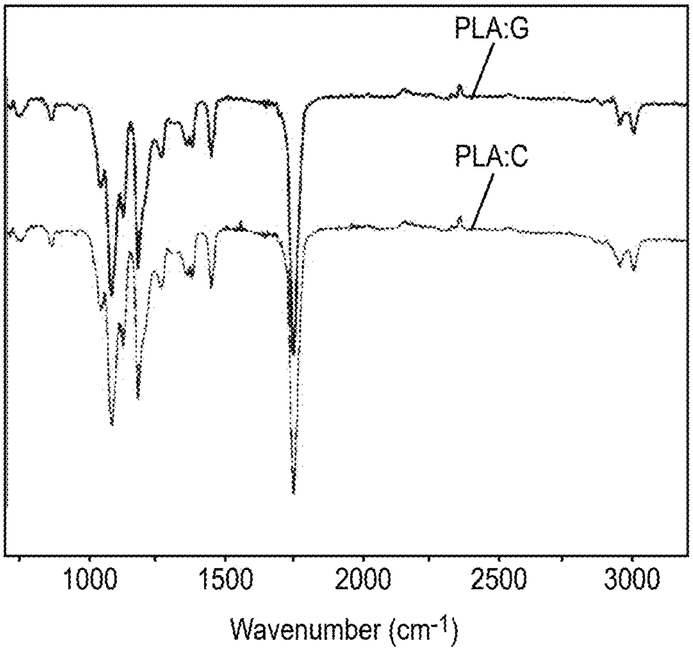
FIG. 3A is a plot of ATR-FTIR spectra of two fabricated membranes formed with different solvents (DMAc and DMSO), according to some embodiments.
Figure 3B:
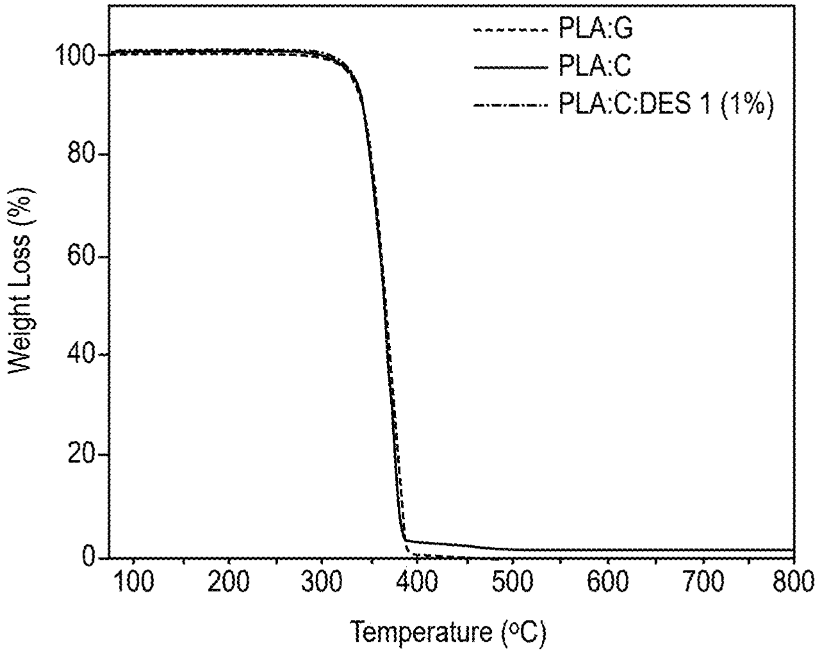
FIG. 3B is a plot of thermal stability for three fabricated membranes, according to some embodiments.

FIG. 3A depicts the ATR-FTIR spectra of PLA:C (Sample 1) compared to PLA:G (Sample 2), where no change in the chemical structure was detected. Hence, no alterations in the chemical characteristics of the base membrane were detected by solvent substitution. The thermal stability in FIG. 3B was used to further confirm this, where the results indicate that both membranes exhibited consistent thermal stability. (FIG. 3B also includes thermal stability of PLA:G:DES 1 (1%) from Batch 2.)

Figure 3C:
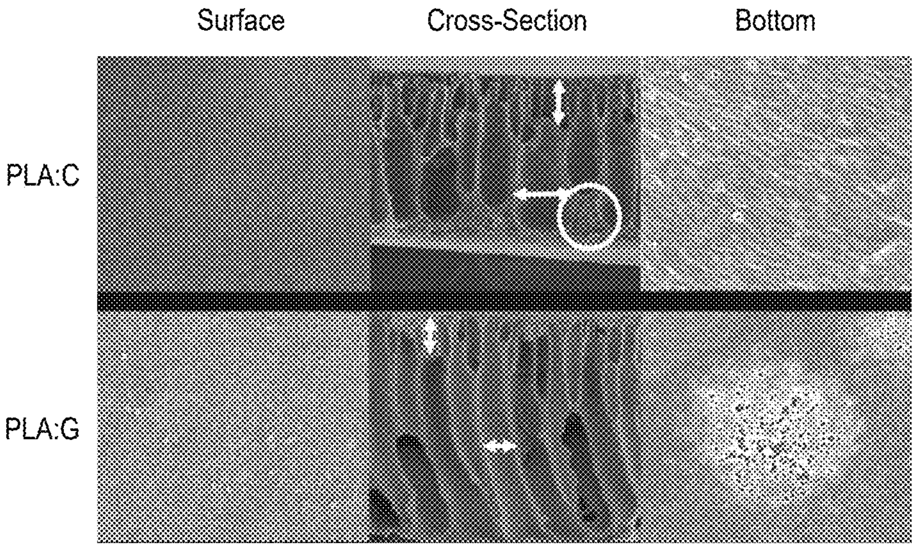
FIG. 3C show scanning electron microscope (SEM) images for the two fabricated membranes of FIG. 3A, according to some embodiments.

Next, the morphological changes due to the solvent were analyzed via SEM analysis. FIG. 3C showed that both membranes exhibited no changes in the membrane surface structure, while morphological changes were more prominent at the bottom surface. Specifically, PLA:G (Sample 2) showed a higher number of pores compared to PLA:C (Sample 1). Moreover, the cross-sectional images captured for both membranes showed diverse characteristics when DSMO was substituted with DMAc; DMAc resulted in an asymmetric structure (PLA:C) including two distinct layers; a dense top layer, and a large proportion of sponge-like microporous structure in the sublayer. On the other hand, using DMSO to form the PLA:G membrane showed a more symmetric structure with longer finger-like macro-voids.

Figure 3D:
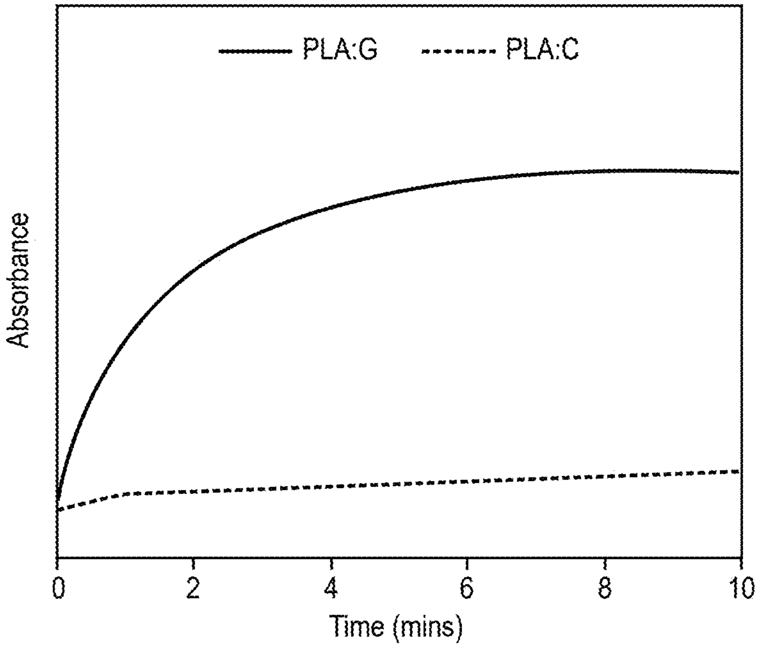
FIG. 3D is a plot of absorbance over time for the two fabricated membranes of FIG. 3A, according to some embodiments.

Such change in the membrane morphology could be attributed to the kinetic and thermodynamic aspects of the system, which greatly influences the phase separation mechanism during polymer precipitation and ultimately, the membrane morphology. Kinetically, the de-mixing path of casting solution in non-solvent is a direct factor that significantly influences the cross-section morphology. Therefore, the absorbance of DMSO and DMAc in the coagulation bath was determined. The results illustrated in FIG. 3D confirmed the difference in the de-mixing rate for both membranes where DMSO showed faster and higher diffusion towards water compared to DMAc, while the de-mixing rate between DMAc and water was significantly slow. The results were consistent with the SEM micrographs obtained for each membrane. From a thermodynamic point of view, when the dope solution is placed in a non-solvent like water, a solvent/non-solvent exchange takes place across the interface of the casting film and the non-solvent. The morphological structure of PLA:C membrane indicated the low affinity between the solvent and the non-solvent which possess delayed de-mixing, and as a result, a denser membrane with sponge-like pores structure was formed. While the high miscibility between DMSO and water resulted in finger-like morphology. In one example, the finger-like morphology can affect the water flux.

Figure 3E:
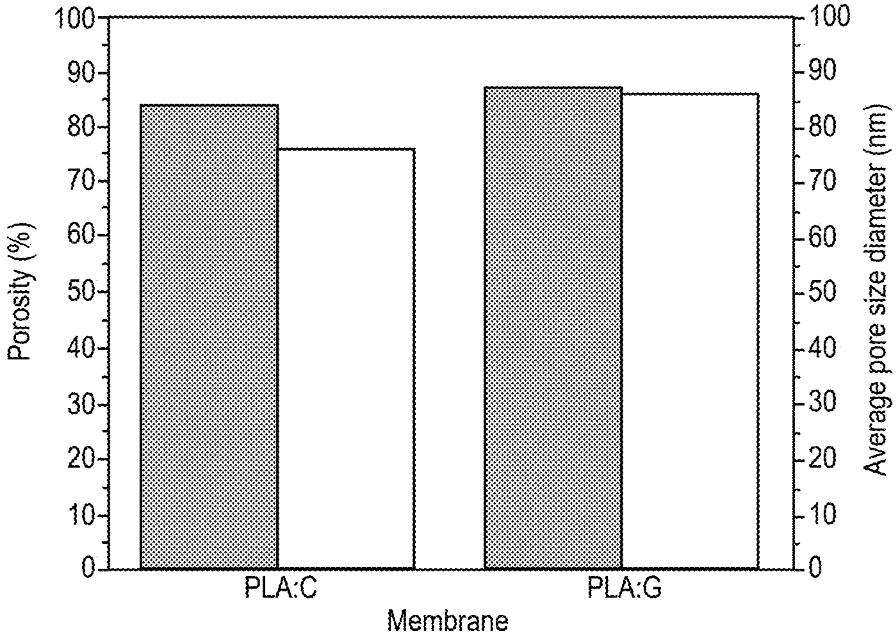
FIG. 3E is a plot of porosity and average pore diameter for the two fabricated membranes of FIG. 3A, according to some embodiments.

FIG. 3E displays alterations in membrane porosity and average pore size consequent to the shift in dissolving solvent from DMAc to DMSO. The calculated porosity and average pore diameter for both membranes showed a higher porosity and larger pore diameter of PLA:G membrane compared to PLA:C membrane.

Figure 4:
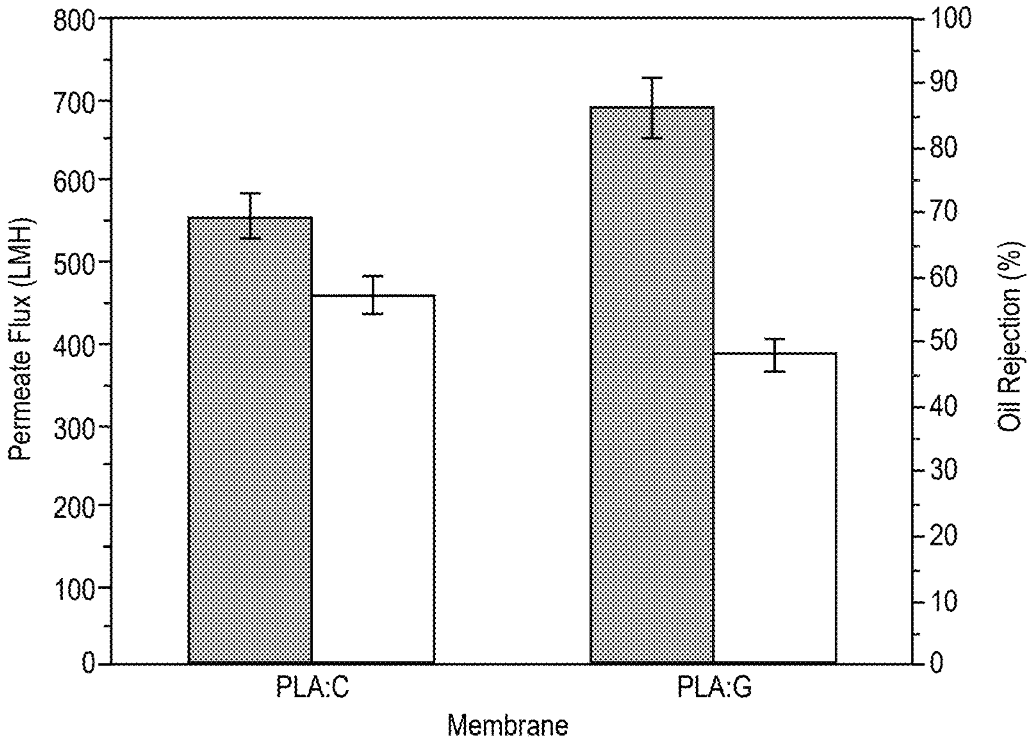
FIG. 4 is a plot of permeate flux and oil rejection for the two fabricated membranes of FIG. 3A, according to some embodiments.

The membranes for Samples 1 and 2 were then tested for performance in terms of water permeability and oil rejection. The results are illustrated in FIG. 4.

The membrane fabricated with DMSO solvent (PLA:G) (Sample 2) exhibited a DI water flux of ~700 $L/m^2 \cdot h$, significantly higher compared to that of PLA:C (Sample 1), which reflected the significant role of the solvents on the membrane performance. The substantial enhancement in flux could be attributed to the change of the membrane structure which facilitated the water permeation through the membrane. Moreover, the membrane structure captured in SEM cross-sectional micrographs showcased that reduction in the membrane selective layer, which notably supported the mass transport of water across the membrane (see FIG. 3C). As shown in FIG. 3E, Sample 2 had a higher porosity and larger pore diameter relative to Sample 1. However, this reduction in the thickness of the selective layer along with the increase in the average pore size diameter had an impact on the membrane's ability to reject oil.

Rejection stands as another important parameter when assessing membrane performance. As depicted in FIG. 4, the oil rejection showed an opposite trend to water flux where the higher rejection was reported by PLA:C (Sample 1) compared to PLA:G (Sample 2). Specifically, the oil rejection for the PLA:C and PLAG membranes are 57%, and 48%, respectively. This could be ascribed to the variation in the membrane pore size; larger pore size results in lower rejection owing to the size exclusion. For example, in terms of oil rejection, PLA:C had higher rejection compared to PLA:G. As such, there was a desire to enhance the oil rejection of the PLA:G membrane to address the compromise between membrane permeability and selectivity, which will be addressed by DES incorporation.

Example 3—Results of Batch 2

Figure 5:
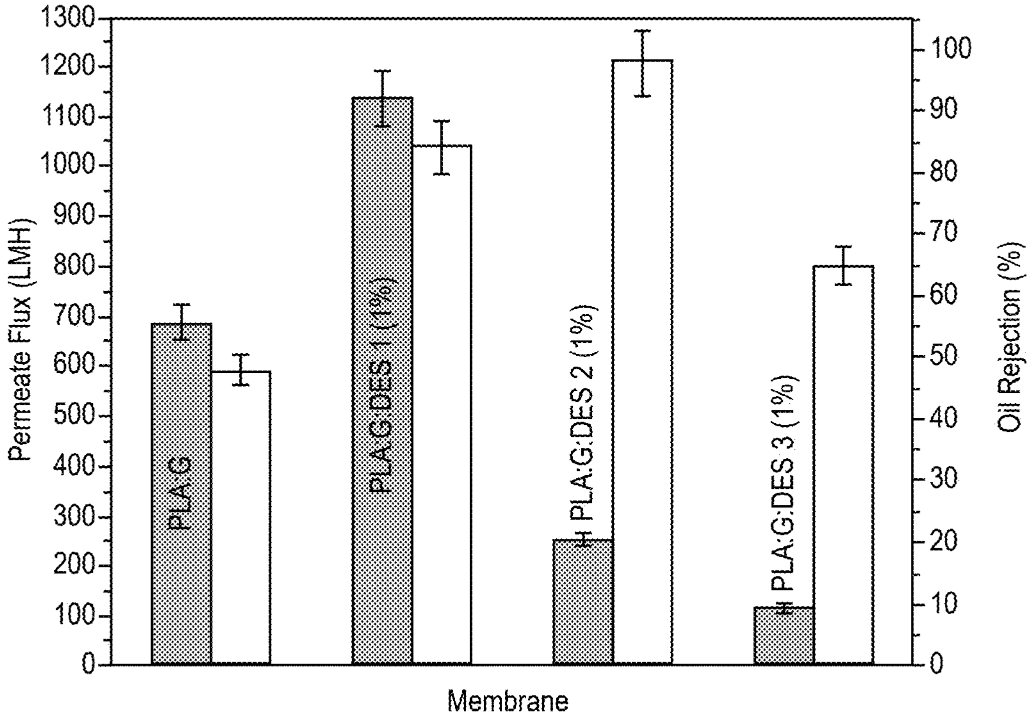
FIG. 5 is a plot of permeate flux and oil rejection for three fabricated membranes made with various pore-forming agents, as compared to a membrane with the same solvent but no pore-forming agent, according to some embodiments.

The influence of incorporating DES as an additive was assessed by fabricating membranes composed of a mixture of PLA, DMSO as a dissolving solvent, and various DESs with a concentration of 1 wt. %. The DESs chosen included hydrophilic ones, specifically Bet:LevA (1:7) (Sample 4) and ChCl:EG (1:2) (Sample 6), along with a hydrophobic DES, specifically Men:Thy (1:1) (Sample 5). The performance of the modified membranes was assessed based on their water permeability and oil rejection. The corresponding findings are illustrated in FIG. 5.

The use of the Bet:LevA (1:7) and Men:Thy (1:1) DESs had a negative effect on the membrane's performance. In a comparison, it can be observed that PLA:G:DES 1 (1%) (Sample 3) exhibited superior permeability. On the other hand, the oil rejection of the membranes prepared with ChCl:EG (1:2), Bet:LevA (1:7) and Men:Thy (1:1) DESs (Samples 3-5), was 84%, 98% and 65%, respectively, which is significantly higher than that of the PLA:G membrane (Sample 2), which was 48%. This could be attributed to the presence of DES in the dope solution, which may have influenced the dynamic viscosity of the solution. Ultimately this affects the thermodynamic instability and eventually alters the phase separation process. Hence, a high-viscosity dope solution leads to a slowdown in the phase inversion process, resulting in membranes with less porosity and lower water flux. On the other hand, the hydrophobicity of DES resulted in delaying the de-mixing process and ultimately reducing membrane porosity.

Another combination of membrane constituents including PLA, DMAc, and ChCl:EG (1:2) DES (Sample 6) was fabricated; however, the resulting dope solution showed incompatibility between its constituents, leading to DES precipitation. Conversely, when PLA, DMSO, and DES were combined (Samples 3-6), a viscous clear dope solution was achieved. Consequently, the membrane constituents including PLA with DMSO as a solvent and ChCl:EG (1:2) as an additive was selected for the subsequent experiments.

Example 4—Results of Batch 3

The Batch 3 membranes (Samples 7-10) were fabricated from a mixture of PLA, DMSO, and ChCl:EG (1:2) DES at various concentrations.

Figure 6A:
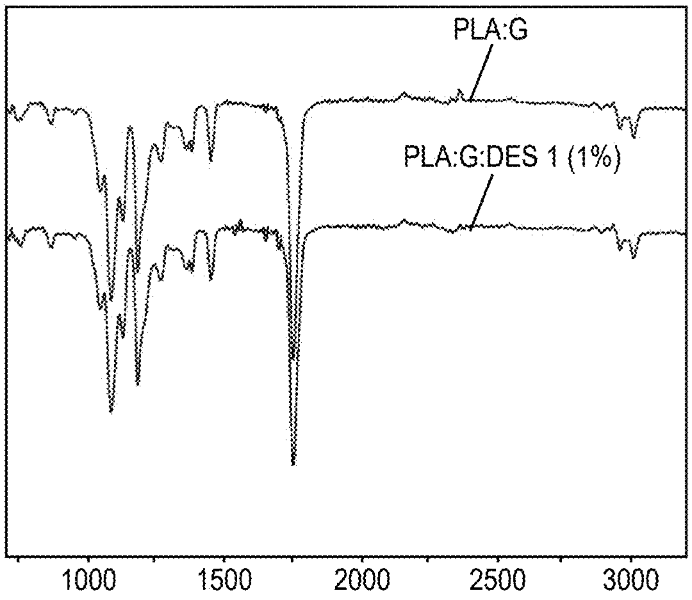
FIG. 6A is a plot of ATR-FTIR spectra of a fabricated membrane formed with a pore forming agent, as compared to a membrane with the same solvent but no pore forming agent (one of the two membranes in FIG. 3A), according to some embodiments.
Figure 6B:
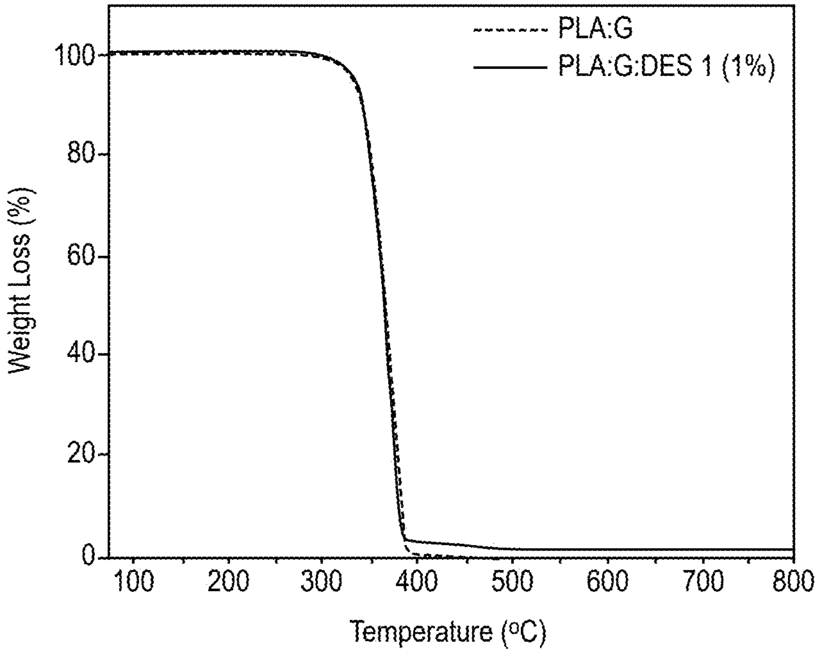
FIG. 6B is a plot of thermal stability for the two fabricated membranes of FIG. 6A, according to some embodiments.

The ATR-FTIR spectra (FIG. 6A) and TGA curves (FIG. 6B) of the membranes with DES remained unchanged relative to the PLA:G membrane from Batch 1, indicating the absence of residual DES within the PLA membrane matrix. Any presence of residual materials would typically form new peaks in the ATR-FTIR spectra or a distinct period of weight loss in the TGA curves. Hence, it was confirmed that incorporating DES into the fabrication process did not alter the chemical structure of the PLA membrane.

Figure 6C:
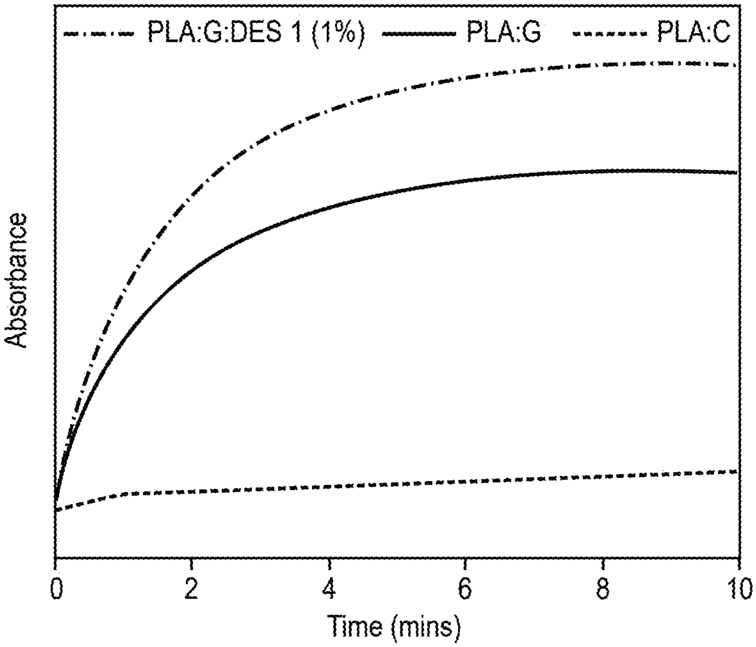
FIG. 6C is a plot of absorbance over time for the two fabricated membranes of FIG. 3A, as well as a membrane with a pore forming agent, according to some embodiments.
Figure 6D:
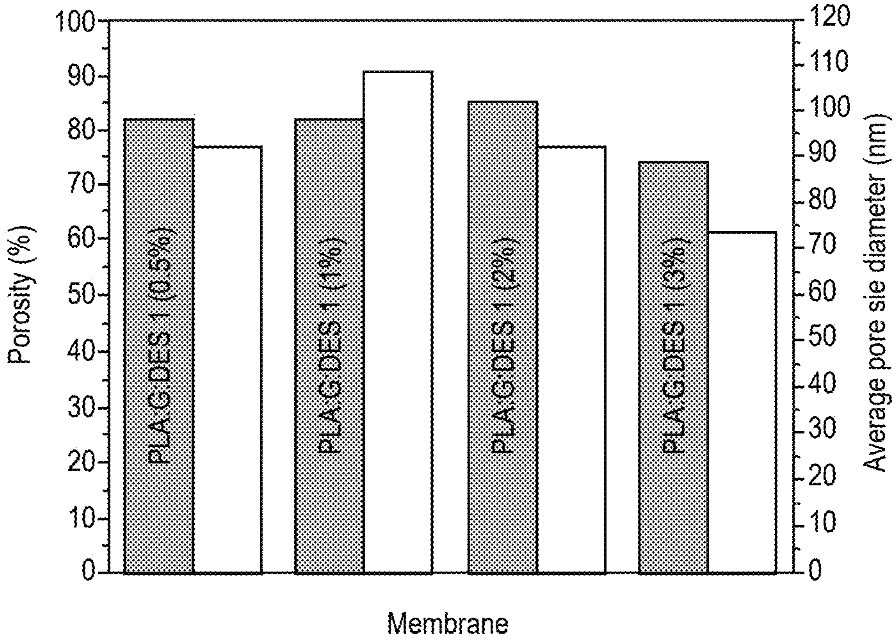
FIG. 6D is a plot of porosity and average pore diameter for four fabricated membranes made with DMSO and a pore forming agent at various levels, according to some embodiments.
Figure 7A:
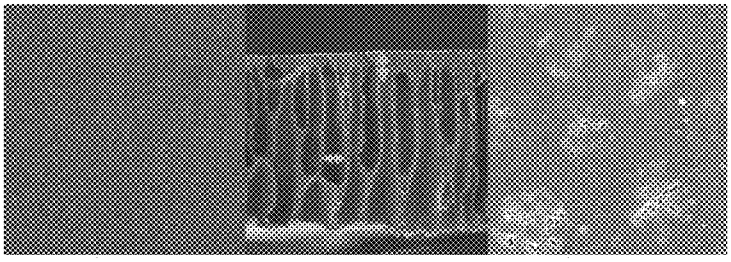
FIG. 7A show scanning electrode microscope (SEM) images for one of the fabricated membranes from FIG. 6D, according to some embodiments.
Figure 7B:
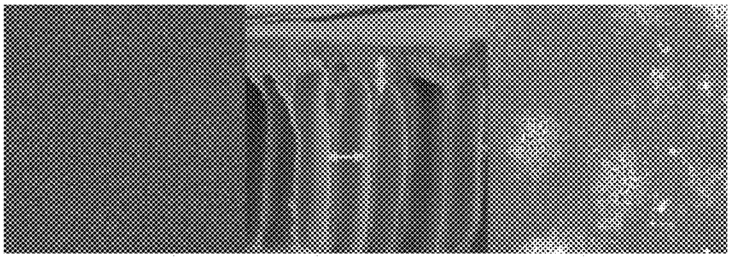
FIG. 7B show scanning electrode microscope (SEM) images for one of the fabricated membranes from FIG. 6D, according to some embodiments.
Figure 7C:
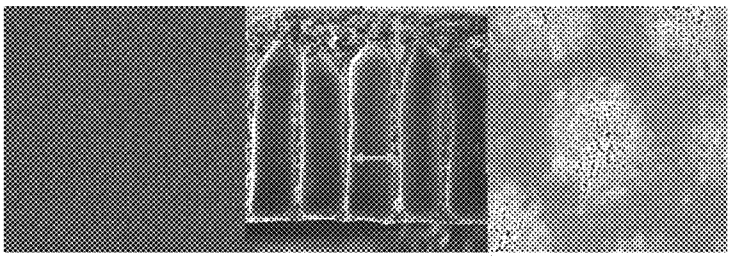
FIG. 7C show scanning electrode microscope (SEM) images for one of the fabricated membranes from FIG. 6D, according to some embodiments.
Figure 7D:
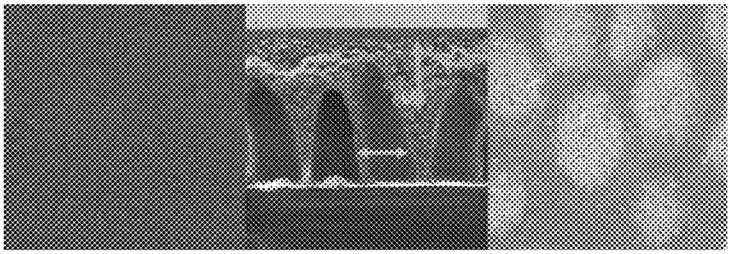
FIG. 7D show scanning electrode microscope (SEM) images for one of the fabricated membranes from FIG. 6D, according to some embodiments.

Subsequently, the morphological changes were also investigated by varying the ChCl:EG (1:2) DES concentration from 0.5% to 3 wt. %. The changes in membrane porosity and mean pore size as a function of DES concentration are illustrated in FIG. 6D. It was found that the increase in the DES concentration up to 2 wt. % resulted in a higher porosity and a larger pore diameter. However, at 3 wt. %, there was a decrease in porosity and pore size diameter, as compared to the DES concentrations at 0.5, 1 and 2 wt. %. This could be attributed to the slow de-mixing rate.

To understand the role of DES in the membrane formation mechanism, the spectroscopic measurement at 265 nm was used to determine the absorbance of DMSO within the coagulation bath for the PLA:G membrane (Sample 2) and the PLA:G:DES 1 (1%) membrane (Sample 3). The results are illustrated in FIG. 6C, which confirms that the introduction of ChCl:EG (1:2) DES increased the DMSO absorbance in DI water and the inflection point shifted to a shorter time direction, confirming the acceleration in the de-mixing process when ChCl:EG (1:2) DES was introduced. Moreover, during phase separation, the high hydrophilicity of the DES resulted in diffusing out more solvent and drawing more water into the membrane, which facilitated the exchange between the solvent and non-solvent, leading to accelerating the de-mixing process. Rapid de-mixing favored the formation of a skin layer with larger and more uniform pores and the development of larger macro-voids in the support layer. These results were confirmed with SEM micrographs in FIGS. 7A-7D.

As illustrated by FIGS. 7A-7D, the increase in DES concentration demonstrated that the morphological changes were more pronounced at the bottom surface of the membrane compared to the top surface. Moreover, the increase in the DES concentration resulted in increasing the thickness of the top active porous layer of the membrane. Moreover, the macro-voids in the sublayer became larger as the DES concentration increased. This could be attributed to the increase in the viscosity of the prepared dope solutions which ultimately hindered the de-mixing rate. Consequently, this has a notable influence on the pores' structural characteristics where smaller pores as well as lower porosity were obtained.

Figure 8:
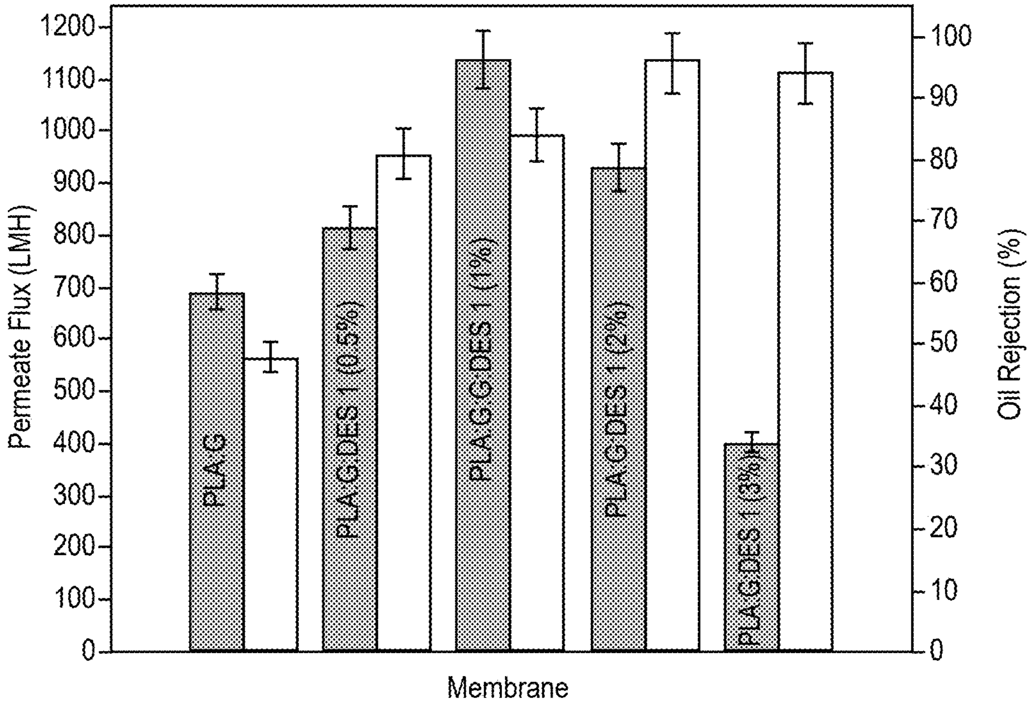
FIG. 8 is a plot of permeate flux and oil rejection for the four fabricated membranes of FIG. 6D, as compared to a membrane with the same solvent but no pore forming agent (one of the two membranes in FIG. 3A), according to some embodiments.

An oil/water filtration performance study was conducted for the fabricated membranes of Batch 3 (Samples 7-10) and compared with the PLA:G membrane of Batch 1 (Sample 2). The results are shown in FIG. 8. It was observed that the DI water flux of membranes with DES additive showed higher values compared to the PLA:G membrane. Moreover, membranes modified with DES additive exhibited a notable increase in the DI water flux as the concentration of the DES increased up to 1% yielding values of 814, and 1138 L/m$^2$h, for PLA:G:DES 1 (0.5%) and PLA:G:DES 1 (1%), respectively. However, a further increase in the DES concentration resulted in a reduction in the membrane permeability where membranes modified with 2 and 3 wt. % of DES yielded a water flux of 930 and 401 L/m$^2$h, respectively. This could be attributed to the significant increase in the dope solution viscosity which dominated the hydrophilicity effect. When DES is added to the mixture, higher viscosity. and hydrophilicity work together to form microporous membranes. The enhanced hydrophilicity of the doping solution facilitates the formation of macro-voids, leading to a porous morphology. The further increase in the DES concentration allowed the viscosity impact to dominate the hydrophilicity effect, and as a result, decreased membrane pore size and porosity. The results were in accordance with the findings from SEM images obtained (see FIG. 8).

On the other hand, the oil rejection increased as a function of the DES concentration. The PLA:G membrane had 48% oil rejection, compared to the membranes modified with DES having the following oil rejection: 81%, 84%, 96%, and 94% for PLA:G:DES 1 (0.5%), PLA:G:DES 1 (1%), PLA:G:DES 1 (2%), and PLA:G:DES 1 (3%), respectively. This behavior was attributed to the formation of a more selective layer that gradually thickened as the DES concentration increased (see FIGS. 7A-7D). Consequently, this thicker selectivity layer acted as a barrier to water molecules, leading to a reduction in the mass transport of water across the membrane. Membrane with 3% DES showed the thickest selective area and very small finger-like pores imitating the poor permeability and enhanced in oil rejection. Therefore, the addition of ChCl:EG (1:2) DES to the dope solution notably enhanced the membrane's performance. Based on the results obtained, PLA:G:DES 1 (2%) membrane was selected to compromise between the high water permeability and oil rejection. The selected membrane was further investigated and compared to the PLA:C membrane in a long-term cross-flow filtration study.

Figure 9A:
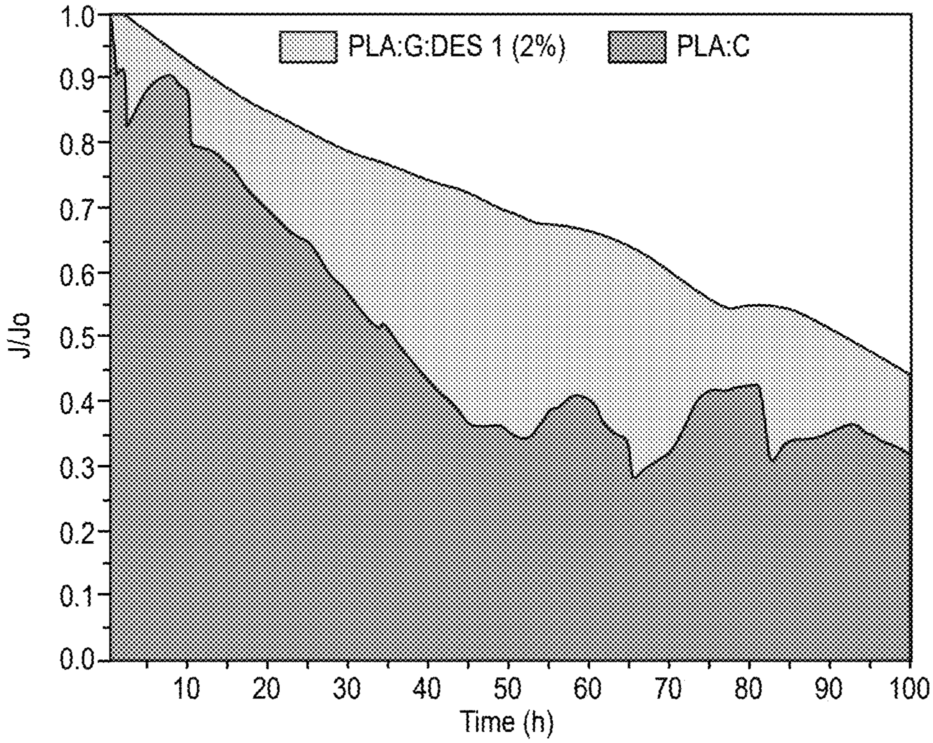
FIG. 9A is a plot of normalized flux for one of the membranes of FIG. 6D (made with DMSO and a pore forming agent), as compared to the membrane in FIG. 3A formed with DMAc and no pore forming agent, according to some embodiments.
Figure 9B:
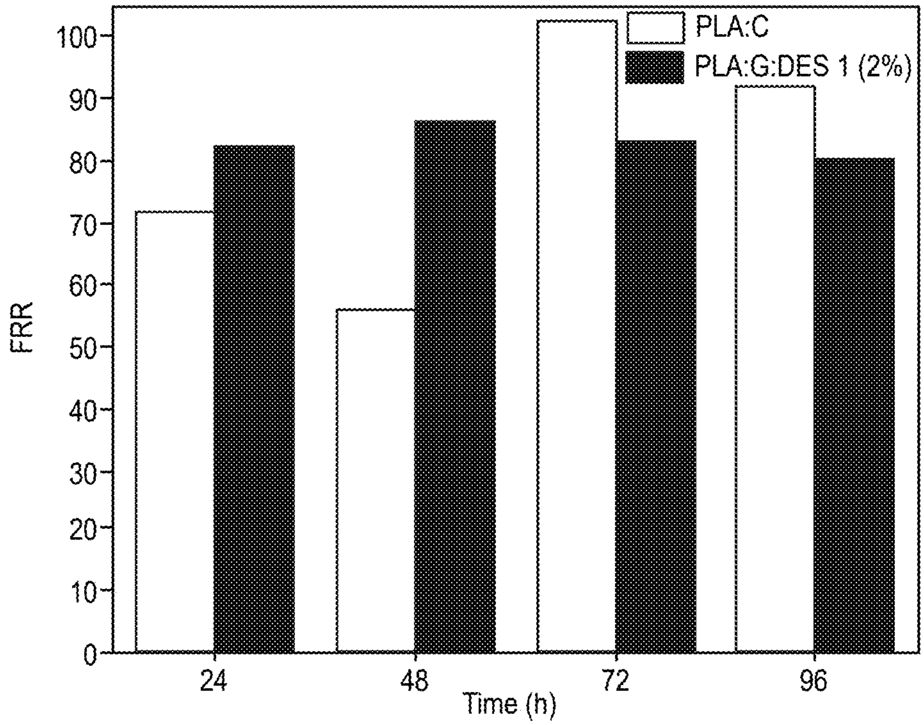
FIG. 9B is a plot of the flux recovery ratio (FRR) as a function of time for the two membranes of FIG. 9A, according to some embodiments.

The normalized flux is shown in FIG. 9A, where an exponential decline in the flux within 100 h was observed for the PLA:C membrane (Sample 1) and the PLA:G:DES 1 (2%) membrane. However, the normalized flux was reported higher for PLA:G:DES 1 (2%) compared to the PLA-C membrane. By the end of the 100 h timeframe, PLA:G:DES 1 (2%) maintained 0.45 of its initial flux, whereas the PLA:C membrane maintained 0.31. The flux recovery ratio (FRR) was calculated in 24 h intervals and is shown in FIG. 9B. It is observed that there is a large fluctuation in the FRR of the PLA:C membrane compared to that of the PLA:G:DES 1 (2%) membrane, which is maintained in interval FRR of 80%. These results indicate that the PLA:C membrane is more susceptible to fouling compared to the PLA:G:DES 1 (2%) membrane.

Figure 9C:
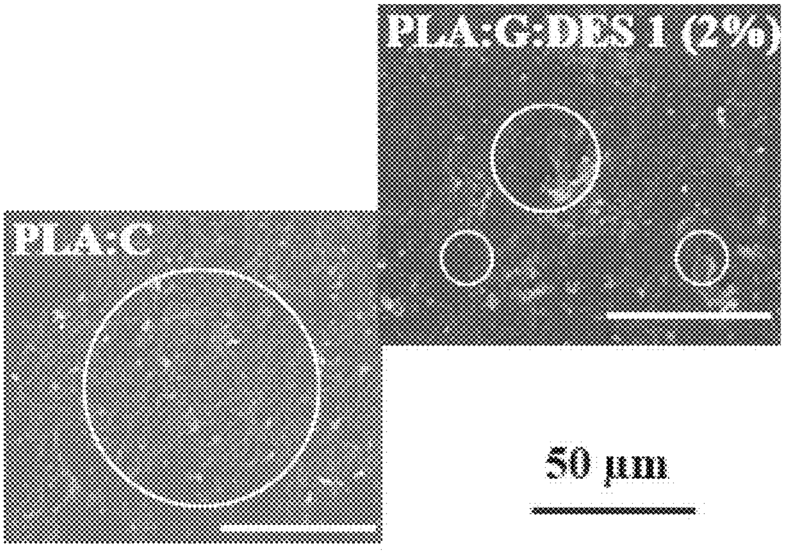
FIG. 9C shows an SEM image on a membrane surface of each of the two membranes of FIG. 9A after performing filtration of an oil-water mixture, according to some embodiments.
Figure 9D:
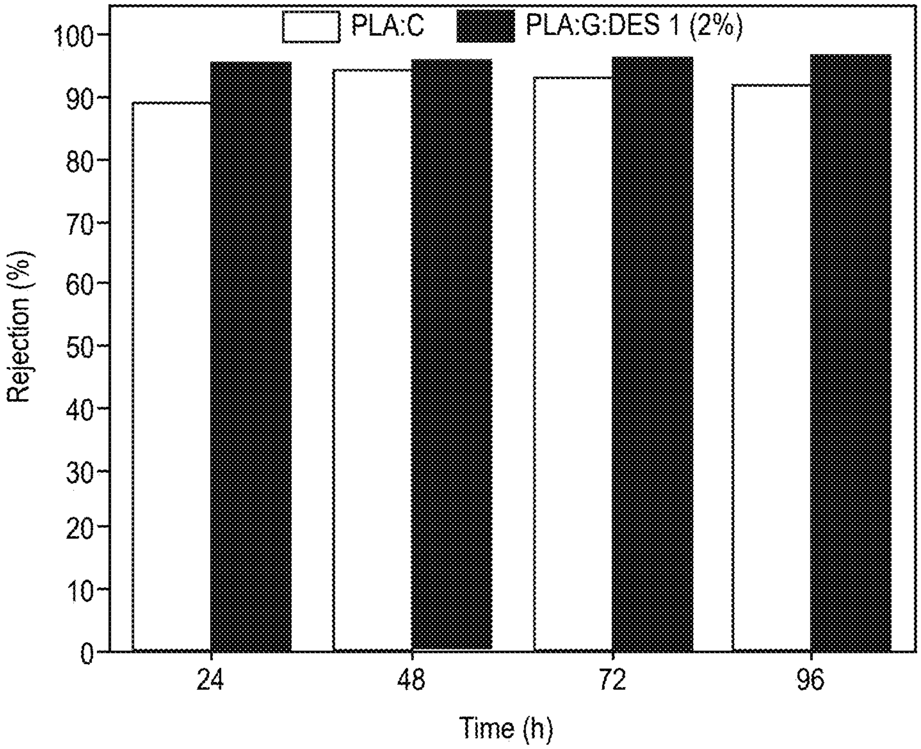
FIG. 9D is a plot of oil rejection as a function of time for the two membranes of FIG. 9A, according to some embodiments.

The post-filtration surface SEM micrographs in FIG. 9C show that there is an evenly distributed oil layer on the membrane surface for the PLA:C, and a more heterogeneous surface on the PLA:G:DES 1 (2%) membrane. This arose due to the pore structure on the PLA:G:DES 1 (2%) membrane, which has a larger pore size compared to the PLA:C membrane, allowing for a redistribution of the oil emulsion after promoting coalescence, as indicated by the SEM images. This is also supported by the rejection measured every 24 h, depicted in FIG. 9D. The rejection was maintained as a result of redistribution and coalescence throughout the entire 100 h period. The rejection declined slightly on the other hand for the PLA:C membrane, due to the lower coalescence on the surface, hence oil droplets could pass through. Using a highly concentrated oil-water feed solution, a maximum rejection of 96% in the PLA:G:DES 1 (2%) membrane was reported. Overall, the fouling potential of the PLA:C membrane was enhanced due to solvent exchange and the structural changes due to DES in the membrane fabrication procedure. While the structural changes increased the average pore size, a higher rejection was maintained over a period of time due to oil coalescence.

Characterization Techniques

Various characterization techniques were employed to study each membrane's chemical structure, morphology, and properties. The chemical structure of each membrane was evaluated using ATR-FTIR spectroscopy (Vertex 80/80v, Bruker, Germany), where the functional groups present in each membrane were scanned. A TGA analyzer was utilized to investigate the thermal stability of each membrane using PerkinElmer-TGA 4000. Each sample was heated under inert (Argon) atmosphere pressure at a temperature range of 30-800° C. at a rate of 10° C./min. The morphology was analyzed using SEM Quanta 250, USE. The top and bottom surfaces were analyzed by placing the membrane coupon on an aluminum stub facing up and down, respectively. To accurately analyze the membrane cross-sectional, freeze-fracture using liquid nitrogen was used to crack the membrane, after which the sample was mounted. All the membranes were coated with a 0.6 nm gold layer using JEC-3000FC Autofine Coater to ensure high-quality imaging. The gravimetric method was used to determine each membrane's porosity (ε). This involved measuring the dry membrane coupon's dimensions and weight first. Then, the membrane was immersed in Silwick® for 1 h. After that, the excess solvent was removed and the wet weight was measured. The porosity was obtained from the ratio of the difference in weight to the total weight. See Equation 1 below:

$$\varepsilon(\%) = \frac{W_w - W_d}{\rho_{H_2O} \times A \times L} \times 100 \tag{1}$$

where $W_w$ and $W_d$ is the weights of the wet and dry membrane, respectively, $\rho_{H_2O}$ is the water density (g/cm$^3$), A membrane active area (cm$^2$), and L is the membrane thickness (cm). The pore size diameter ($r_m$) was calculated using the Guerout-Elford-Ferry equation (Equation 2 below):

$$r_m = \frac{\sqrt{(2.9 - 1.75\varepsilon)8\eta\delta Q}}{\varepsilon \times A \times \Delta P} \tag{2}$$

where η is the water viscosity ($8.9\times10^{-4}$ Pa·s), δ is the membrane thickness (m), Q is the permeate flow rate across the membrane ($m^3/s$), and ΔP is the transmembrane pressure (Pa).

To study the kinetics of the de-mixing process, a UV-Vis spectrophotometer (UV-4802S, Unico, USA) was used to measure the absorbance of solvent in DI water. 10 μL of dope solution was placed into a quartz cell where the outside of the cell was covered with black paper to prevent transmission of UV light through the solution. After that, 1 mL of DI water was added to the quartz cell and then, the absorbance of dissolving solvent in the water was measured at a specific wavenumber for 10 min. After membrane characterization, the membranes' performance was evaluated based on various tests, namely, (1) membrane permeability, (2) membrane's ability to reject oil from oily wastewater, and (3) investigation of the membrane's long-term performance. The experimental tests were conducted at room temperature using a dead-end stirred filtration cell (UHP 4370). The effective area of the membrane used in the tests was determined to be 15.20 $cm^2$. Initially, all membranes were compacted by applying a hydrostatic pressure of 2 bar for 50 min until a stable flux was established. The DI water flux $Jw_1$ of each membrane was then measured under an applied pressure of 1 bar. After that, the water permeability of each membrane was determined using Equation 3 below:

$$J_w(LMH) = \frac{V}{A \cdot \Delta t} \tag{3}$$

where V is the collected volume (L), and Δt is the time required to collect the water (h). The water permeability flux was obtained by replicating each membrane sample three times under identical conditions and the average water permeability flux was calculated.

Next, the DI water was substituted with a 1000 ppm oil-water emulsion, serving as a model for simulating oily wastewater. This emulsion was prepared by dissolving 1 g of vegetable oil in DI water at ambient room temperature with the addition of Tween-80® surfactant to ensure the homogenization of the mixture. Throughout the experiment, the as-prepared solution was filtered through the membrane at a constant pressure of 1 bar for 30 min. Samples from feed and permeate were collected and their respective concentrations were quantified using a total organic carbon (TOC) analyzer (TOC-L series from Shimadzu, Japan) equipped with an auto-sampler. Subsequently, the oil rejection percentage (R) was calculated using Equation 4 below:

$$R(\%) = \frac{C_f - C_p}{C_f} \times 100 \tag{4}$$

where $C_f$ and $C_p$ are the protein concentration in the feed and permeate, respectively. Following the filtration of the oil-water emulsion, the membranes were rinsed with DI water for a duration of 30 min, and subsequently, another cycle of water flux ($Jw_3$) assessment was conducted under identical conditions. Then, the flux recovery ratio (FRR) is calculated using Equation 5 below:

$$FRR(\%) = \frac{Jw_3}{Jw} \times 100 \tag{5}$$

With the objective of replicating industrial conditions, the membranes were tested using a cross-flow setup to filter 1000 ppm oil/water emulsion. A constant feed flow rate of 0.1 m/s was maintained, and the filtration process was carried out in a recycling mode where the concentrate stream was cycled back into the feed. The flux decline, rejection, and flux recovery were studied for both membranes.

Discussion of Possible Embodiments

The following are non-exclusive descriptions of possible embodiments of the present invention.

According to one aspect, a method of forming a porous membrane includes preparing a porous membrane using a dope solution of polymer, dimethyl sulfoxide (DMSO), and one or more deep eutectic solvents (DES).

The method of the preceding paragraph can optionally include, additionally and/or alternatively any one or more of the following features/steps, configurations, and/or additional components.

For example, the method may further include casting the dope solution to form a film; and immersing the film in a coagulation bath to form the porous membrane. For example, the polymer can be polylactic acid (PLA).

For example, the dope solution can be formed by forming or providing a first solution of the one or more deep eutectic solvents; mixing a DMSO solvent and a polymer to dissolve the polymer and form a second solution; and mixing the first solution and second solution together to form the dope solution.

For example, the one or more deep eutectic solvents can include a hydrogen bond acceptor (HBA) and a hydrogen bond donor (HBD).

For example, a molar ratio of HBA to HBD in the dope solution can be about 1:2.

For example, the HBA can be choline chloride (ChCl).

For example, the HBD can be ethylene glycol (EG).

For example, an amount of the one or more deep eutectic solvents (DES) in the dope solution can be between about 0.5 wt. % and 3.0 wt. %.

An ultrafiltration membrane can be formed by a porous membrane using a dope solution of polymer, dimethyl sulfoxide (DMSO), and one or more deep eutectic solvents (DES).

For example, an average pore size diameter of the porous membrane can be between about 70 and 100 nm.

For example, a porosity of the porous membrane can be between about 70 and 90 percent.

According to another aspect, a method of fabricating an ultrafiltration membrane includes forming a deep eutectic solvent (DES) solution of a hydrogen bond acceptor (HBA) and a hydrogen bond donor (HBD); forming a polymer solution by dissolving a PLA polymer in dimethyl sulfoxide (DMSO); mixing the DES solution and the polymer solution to form a dope solution; casting the dope solution onto a plate; and immersing the plate in a coagulation bath to form a porous PLA membrane; and optionally rinsing the porous PLA membrane to remove residual solvents and impurities.

The method of the preceding paragraph can optionally include, additionally and/or alternatively any one or more of the following features/steps, configurations, and/or additional components.

For example, the HBA can be choline chloride (ChCl) and the HBD can beethylene glycol (EG).

For example, a molar ratio of ChCl to EG can be about 1:2.

For example, a sum of the HBA and the HBD in the dope solution can be between about 0.5 wt. % and 3.0 wt. %.

According to another aspect, a method of separating oil and water using an ultrafiltration membrane, fabricating an ultrafiltration membrane from PLA, dimethyl sulfoxide (DMSO) and one or more deep eutectic solvents (DES) using non-solvent induced phase separation; and filtering an oil-water emulsion through the ultrafiltration membrane to remove oil from water.

The method of the preceding paragraph can optionally include, additionally and/or alternatively any one or more of the following features/steps, configurations, and/or additional components.

For example, the oil rejection of the ultrafiltration membrane can be at least 80%.

For example, the oil rejection of the ultrafiltration membrane can be at least 90%.

For example, an amount of oil in the oil-water emulsion can range from about 100 ppm to about 1000 ppm.

For example, a permeate flux of the ultrafiltration membrane can be at least 800 LMH.

For example, a permeate flux of the ultrafiltration membrane can be between 800 LMH and 1150 LMH.

According to one aspect, a method of forming a ultrafiltration porous membrane includes preparing a dope solution including a polymer (e.g., polylactic acid (PLA)), dimethyl sulfoxide (DMSO), and one or more deep eutectic solvents (DES); mixing the DES, solvent, and the polymer to form a dope solution; casting the dope solution onto a glass plate; and immersing the plate in a coagulation bath to form a porous PLA membrane; and optionally rinsing the porous PLA membrane to remove residual solvents and impurities.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a porous membrane, the method comprising:

preparing a porous membrane using a dope solution of polymer, dimethyl sulfoxide (DMSO), and one or more deep eutectic solvents (DES), wherein an amount of the one or more deep eutectic solvents (DES) in the dope solution is between about 0.5 wt. % and 3.0 wt. %.

2. The method of claim 1, further comprising casting the dope solution to form a film; and immersing the film in a coagulation bath to form the porous membrane.

3. The method of claim 1, wherein the polymer is polylactic acid (PLA).

4. The method of claim 1, wherein the dope solution is formed by:

forming or providing a first solution of the one or more deep eutectic solvents;

mixing a DMSO solvent and the polymer to dissolve the polymer and form a second solution; and mixing the first solution and second solution together to form the dope solution.

5. The method of claim 1, wherein the one or more deep eutectic solvents includes a hydrogen bond acceptor (HBA) and a hydrogen bond donor (HBD).

6. The method of claim 5, wherein a molar ratio of HBA to HBD in the dope solution is about 1:2.

7. The method of claim 5, wherein the HBA is choline chloride (ChCl).

8. The method of claim 5, wherein the HBD is ethylene glycol (EG).

9. The method of claim 1, wherein an average pore size diameter of the porous membrane is between about 70 and 100 nm.

10. The method of claim 1, wherein a porosity of the porous membrane is between about 70 and 90 percent.

11. A method of fabricating an ultrafiltration membrane, the method comprising:

forming a deep eutectic solvent (DES) solution of a hydrogen bond acceptor (HBA) and a hydrogen bond donor (HBD); forming a polymer solution by dissolving a PLA polymer in dimethyl sulfoxide (DMSO); mixing the DES solution and the polymer solution to form a dope solution; casting the dope solution onto a plate; and immersing the plate in a coagulation bath to form a porous PLA membrane; and optionally rinsing the porous PLA membrane to remove residual solvents and impurities.

12. The method of claim 11, wherein the HBA is choline chloride (ChCl) and the HBD is ethylene glycol (EG).

13. The method of claim 12, wherein a molar ratio of ChCI to EG is about 1:2.

14. The method of claim 11, wherein a sum of the HBA and the HBD in the dope solution is between about 0.5 wt. % and 3.0 wt. %.

15. A method of separating oil and water using an ultrafiltration membrane, the method comprising:

fabricating an ultrafiltration membrane from PLA, dimethyl sulfoxide (DMSO) and one or more deep eutectic solvents (DES) using non-solvent induced phase separation; and filtering an oil-water emulsion through the ultrafiltration membrane to remove oil from water, wherein oil rejection is at least 90%.

16. The method of claim 15, wherein an amount of oil in the oil-water emulsion ranges from about 100 ppm to about 1000 ppm.

17. The method of claim 15, wherein a permeate flux of the ultrafiltration membrane is at least 800 LMH.

* * * * *